C. F. BETZ.
MACHINE FOR MAKING PRETZELS.
APPLICATION FILED SEPT. 13, 1917.
1,250,779.
Patented Dec. 18, 1917.
3 SHEETS—SHEET 3.
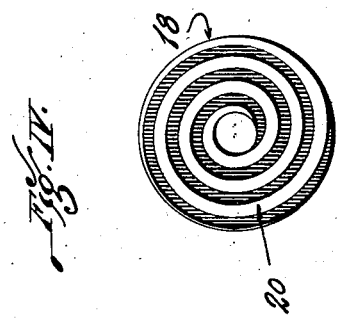
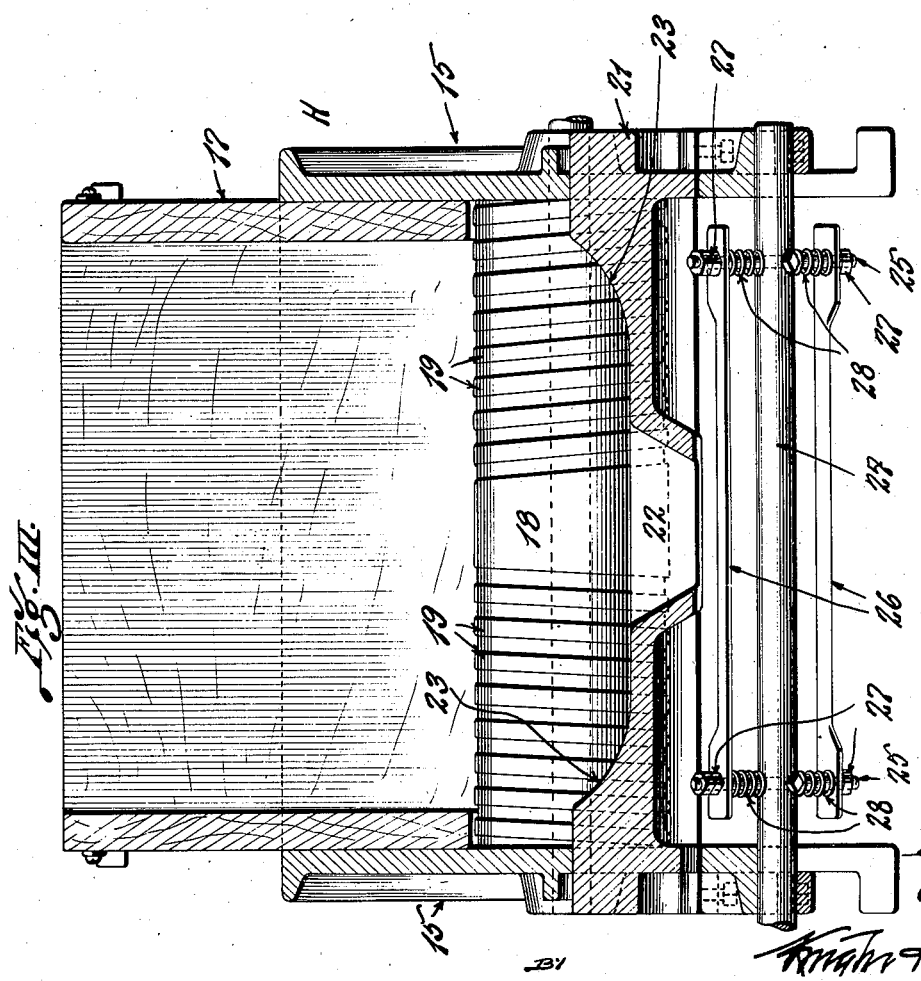

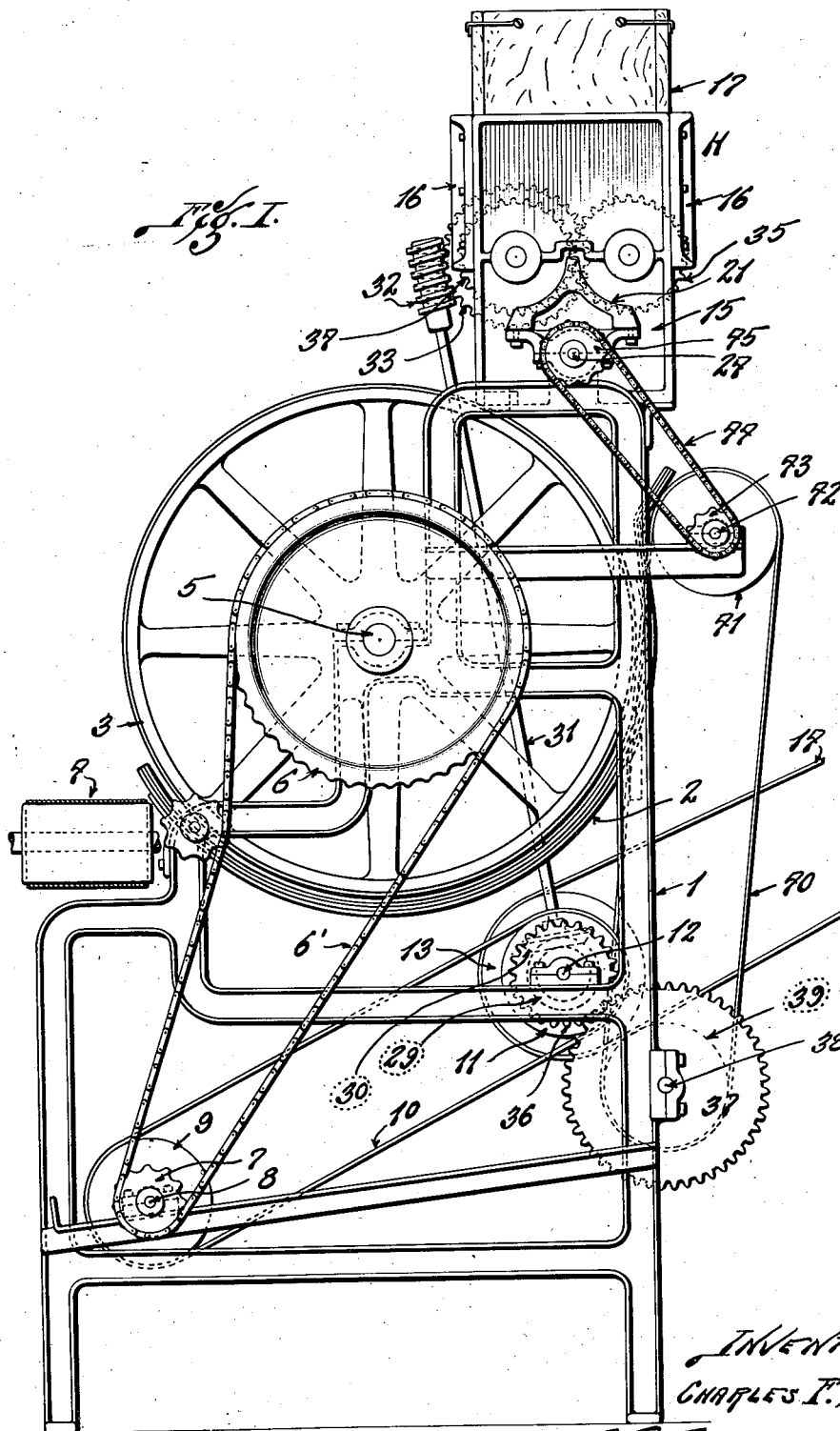

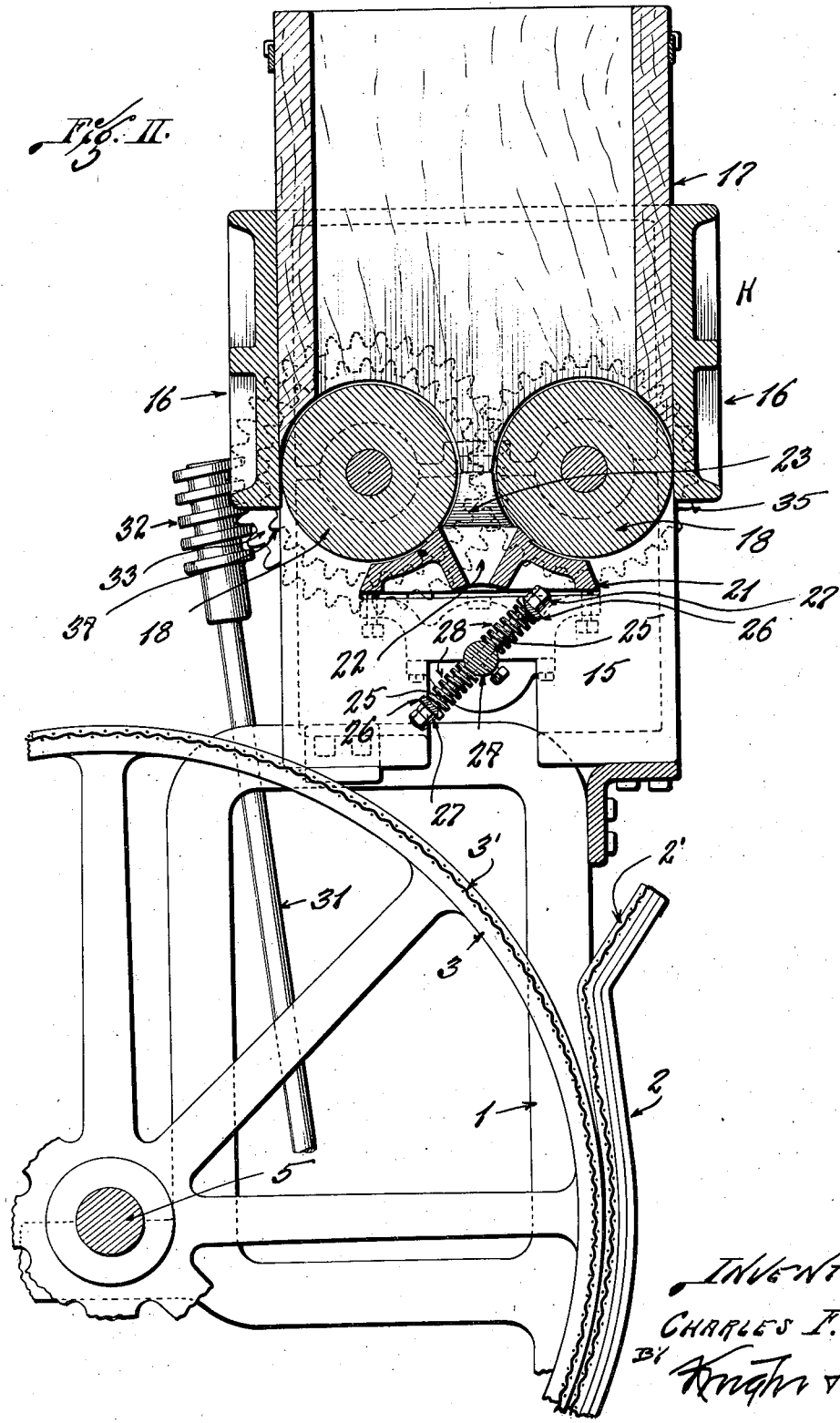

UNITED STATES PATENT OFFICE.

CHARLES F. BETZ, OF ST. LOUIS, MISSOURI.

MACHINE FOR MAKING PRETZELS.

1,250,779.  Specification of Letters Patent.  Patented Dec. 18, 1917.

Application filed September 13, 1917. Serial No. 191,139.

*To all whom it may concern:*

Be it known that I, CHARLES F. BETZ, a citizen of the United States of America, a resident of the city of St. Louis, State of Missouri, have invented certain new and useful Improvements in Machines for Making Pretzels, of which the following is a full, clear, and exact description, reference being had to the accompanying drawings, forming a part of this specification.

My invention relates to a machine for handling dough to produce therefrom rolled strips ready to be shaped into pretzel form preparatory to baking the pretzels. The present invention is in the nature of an improvement upon the character of machine shown and described in U. S. Letters Patent No. 653,060, issued to me July 3, 1900.

In the use of the machine covered by the above mentioned patent it has been necessary to shape the dough from which the pretzels were to be made into sheet form, and deliver it upon a carrier to a cutting device by which the dough was cut into narrow strips, and thereafter deliver the strips to a dough rolling drum between which and an adjacent pressure bed the strips of dough were rolled into the form required before shaping them into pretzels. Such machine involved the use of considerable mechanism for the delivery of the sheet of dough to the cutting device, and it further involved the labor of the preparation of the dough into sheet form, both of which are eliminated by my present improvement.

Figure I is a side elevation of my improved pretzel making machine.

Fig. II is an enlarged vertical cross section through the upper portion of the machine.

Fig. III is partly a longitudinal section through the dough box and the parts immediately beneath said dough box, the dough cutting device being shown in elevation.

Fig. IV is an end view of one of the dough feeding rolls.

The means in my improved machine for rolling the strips of dough after they are cut from the batch of dough introduced into the machine is similar to that in my earlier patent, and may be briefly described as follows:

1 designates one of a pair of side frames which may be of any suitable form to support the members mounted and supported thereby.

2 designates a curved pressure bed secured in any desired manner to the side frames 1, and 3 is a dough rolling drum having its periphery disposed to move in proximity to the curved pressure bed 2. The dough rolling drum preferably includes a cylindrical working face 3' of wire cloth, and the pressure bed 2 preferably includes a working face 2' of wire cloth, working faces of this kind being made use of to facilitate the rolling of the narrow strips of dough which are delivered between the periphery of the dough rolling drum and the pressure bed 2 and operated upon as contemplated in my prior patent. The strips of dough to be rolled are delivered to the upper end of the pressure bed 2, and, after being rolled, pass over the lower end of said pressure bed onto a conveyer 4 by which they are delivered to the operators who form them into pretzels.

The dough rolling drum 3 is supported by a shaft 5 mounted in the side frames 1, said shaft having thereon a pulley, or wheel, 6 operable by an endless belt 6. The belt 6 is operated by a pulley, or wheel, 7 fixed to a shaft 8, which also has fixed to it a pulley 9 driven by a belt 10. The belt 10 is operated by a drive pulley 11 fixed to the main power shaft 12 of the machine which is provided also with a pulley 13 operable by a drive belt 14 leading from any suitable source of power. No patentable novelty is herein claimed for the parts thus far described, my present invention residing in means which I am about to describe through the medium of which a batch of dough of no definite form is first reduced to a shape suited for cutting strips therefrom of the requisite size for the production of pretzels, and thereafter cutting the dough into strips which are delivered to the hereinbefore rolling device.

The means for preparing the dough for delivery to the rolling device is located above the entrance way between the drum 3 and pressure bed 2, and is supported by the side frames 1, as seen in Figs. I and II.

15 designates the side plates and 16 the front and rear plates of a housing H adapted to receive a dough box or hopper 17. The dough box or hopper is removable from said housing and is preferably composed of a series of sections suitably held together to be separated for the purpose of thoroughly cleansing them when the dough box is taken from the housing H.

18 designates a pair of feed rolls arranged parallel with each other within the housing H, but spaced apart as seen in Fig. II. These rolls are adapted to be turned toward each other by mechanism to be hereinafter described for the purpose of drawing dough placed in the dough box 17 downwardly between the rolls. Each of the rolls 18 is grooved spirally from each end toward the center of the roll, thereby providing spiral ribs 19 which tend to move the dough toward the center of the rolls while passing between them. The central portion of each roll is preferably plain, as seen in Fig. III, thereby avoiding any lateral movement of the dough at this point. Each of the rolls 18 is provided at its ends with a spiral rib 20, see Fig. IV, through the medium of which any dough which finds access between the ends of the rolls and the housing H will be conducted from such position instead of remaining therein to interfere with the operation of the rolls.

21 designates a dough former having its ends mounted in the sides of the housing H. This dough former is located beneath the feed rolls 18, and it is provided with an elongated tapered orifice 22 located in proximity to the centers of the feed rolls 18. The orifice 22 is of a size and shape suited for the passage of a narrow strip of dough through the orifice 22 when the dough is delivered thereto by the rolls 18, and the upper surface of the dough former is preferably curved or inclined so that it slopes as seen at 23 from each end toward the orifice 22, thereby facilitating the movement of the dough through the orifice instead of permitting it to become banked upon the dough former.

24 designates a shaft arranged parallel with the feed rolls 18 and in alinement with the orifice 22 in the dough former through which the dough is forced by said feed rolls. This shaft has mounted therein a pair of transverse rods 25 which receive knives 26 held thereon by suitable means such as nuts 27 secured to the rods 25. Between the knives 26 and the shaft 24 are springs 28 which permit the knives to move toward the shaft 24 when undue pressure is brought to bear against the side faces of the knives. During rotation of the shaft 24 the knives 26 are moved into proximity with the bottom of the portion of the dough former 21 containing the orifice 22, and as the knives traverse said orifice they cut strips from the dough which has been delivered through said orifice in the manner already explained. The springs 28 are of service only in the event of some hard foreign substance accidentally being delivered into the dough box and finding its way to the orifice 22, in which event the springs permit the knives 26 to move away from the dough former 21 and escape the object which would tend to injure the knives if the latter were not permitted to yield. The strips of dough as they are cut by the knives 26 fall onto the dough rolling drum 23 and are rolled between this drum and the pressure bed 2 being discharged onto the conveyer 4 when the desired rolling action has taken place.

The feed rolls 18 are operated through the medium of the power shaft 12. Said power shaft has fixed to it at its end opposite that seen in Fig. I, a bevel pinion 29 (see dotted lines, Fig. I) arranged in mesh with a bevel pinion 30 fixed to a shaft 31 which extends upwardly into proximity to the feed rolls, and has fixed to it a worm 32. The worm 32 is arranged in mesh with a worm wheel 33 fixed to one of the feed roll shafts. The shaft of the feed roll, on which the worm wheel 33 is mounted, also has fixed to it a spur wheel 34 which meshes with a spur wheel 35 fixed to the second feed roll, thereby providing for the coöperation of the two feed rolls.

The shaft 24 by which the dough cutting knives 26 are carried, is driven by power received from the power shaft 12 in the following manner: 36 is a spur wheel fixed to the shaft 12 and arranged in mesh with a second spur wheel 37. The spur wheel 37 is fixed to a shaft 38 on which is mounted a pulley 39 which receives a drive belt 40 leading to a pulley 41. The pulley 41 is located near the upper end of the machine, and the shaft 42 by which it is supported and operated has fixed to it a wheel 43 adapted to drive a belt 44 leading to a wheel 45 fixed to the knife carrying shaft 24.

I claim:—

1. In a pretzel making machine, the combination of dough rolling means, and means for delivering narrow strips of dough to said dough rolling means, said delivering means comprising a pair of feed rolls, a dough former having an elongated orifice therein through which dough is fed by said feed rolls, and a knife for cutting the dough into strips as it passes through the orifice in said dough former.

2. In a pretzel making machine, the combination of dough rolling means, and means for delivering strips of dough to said dough rolling means, said delivering means comprising a pair of feed rolls, a dough former having an elongated orifice of less length than the length of said feed rolls, through which dough is delivered by said feed rolls, and a knife for cutting the dough into strips as it passes through said orifice.

3. In a pretzel making machine, the combination of dough rolling means, and means for delivering strips of dough to said dough rolling means, said delivering means comprising a pair of rolls and a dough former having an elongated orifice therein of less length than the length of the rolls and having sloping upper longitudinal faces leading to said orifice, and a knife for cutting the dough into strips as it is fed through said orifice by said feed rolls.

4. In a pretzel machine, the combination of dough rolling means, and means for delivering strips of dough to said rolling means, said delivering means comprising a pair of spirally grooved rolls, a dough former having an elongated orifice therein through which dough is delivered by said feed rolls, and a knife for cutting the dough as it is fed through said orifice.

5. In a pretzel machine, the combination of dough rolling means, and means for delivering strips of dough to said dough rolling means, said delivering means comprising a pair of rolls having spiral ribs thereon leading from the ends of the rolls toward the centers of the rolls, a dough former having an elongated orifice through which dough is fed by said feed rolls, and a knife for cutting the dough into strips as it is fed through said orifice.

6. In a pretzel machine, the combination of dough rolling means, and means for delivering strips of dough to said dough rolling means, said delivering means comprising a pair of feed rolls each having a plain central portion and spiral ribs leading from the ends of the feed rolls toward said plain central portion, a dough former beneath said rolls having an elongated orifice therein opposite the plain central portions of said rolls, and a knife for cutting the dough into strips as it is fed through the orifice in said dough former by said feed rolls.

7. In a pretzel machine, a dough former having an orifice through which dough may be delivered, means for feeding dough through said orifice, a movable knife support, a knife slidably fitted to said knife support adapted to be moved across the orifice in said dough former, and means for yieldingly holding said knife in its operative position.

8. In a pretzel machine, a dough former having an orifice through which dough may be delivered, means for feeding dough through said orifice, a rotatable shaft in proximity to the orifice in said dough former, rods carried by and extending transversely of said shaft, a knife loosely fitted to said rods and springs on said rods between the shaft and knife, whereby the knife is yieldingly pressed outwardly relative to the shaft.

9. A machine of the character described, a housing, a pair of dough feeding rolls arranged in said housing, and a dough carrier through which dough may be fed by said feeding rolls, said feeding rolls being spirally grooved at their end faces to provide for the discharge of dough from the spaces between the ends of the rolls and said housing.

In testimony that I claim the foregoing I hereunto affix my signature.

CHAS. F. BETZ.